United States Patent [19] [11] 3,745,350
Hill et al. [45] July 10, 1973

[54] APPARATUS RESPONSIVE TO RADIATION ATTENUATION OF AN ATMOSPHERE

[75] Inventors: Edwin T. Hill, Cowes; John Harvey Quick, East Cowes, both of England

[73] Assignee: Plessey Handel und Investments A.G., Zug, Switzerland

[22] Filed: May 3, 1971

[21] Appl. No.: 139,712

[30] Foreign Application Priority Data
May 2, 1970 Great Britain.................. 21,188/70
June 13, 1970 Great Britain.................. 28,731/70

[52] U.S. Cl.............. 250/218, 250/220 C, 356/103, 356/207, 356/208
[51] Int. Cl... G01n 21/00, G01n 21/12, G01n 21/26
[58] Field of Search.................. 356/103, 207, 208; 250/218, 220 C

[56] References Cited
UNITED STATES PATENTS
3,518,437 6/1970 Riggs .............................. 250/218 X
3,510,666 5/1970 Topol................................ 250/218
3,563,661 2/1971 Charlson et al..................... 356/103
3,462,608 8/1969 Weston et al....................... 250/218
2,925,007 2/1960 Silver................................. 356/103
3,524,707 8/1970 Hansen, Sr. et al. ............... 356/103
3,317,730 5/1967 Hilsum........................... 356/103 X
3,299,769 1/1967 Byers.................................. 356/103
3,672,775 6/1972 Furengel........................... 356/103

Primary Examiner—James W. Lawrence
Assistant Examiner—T. N. Grigsby
Attorney—Mason, Mason & Albright

[57] ABSTRACT

Visibility-responsive apparatus is disclosed in which a light beam is transmitted across a space, and the amount of light which is scattered in a predetermined direction relative to the beam is measured by an appropriately positioned light receiver, this amount being dependent on the optical extinction coefficient of the atmosphere within the space. In one embodiment, a second light receiver, directly in line with the beam, is provided, and the ratio of the outputs of the two light receivers is taken so as to eliminate variations in the transmitted beam intensity. In another embodiment, the second light receiver is used to maintain the intensity of the transmitted beam substantially constant. The apparatus may be modified to respond to non-visible radiation.

3 Claims, 5 Drawing Figures

Patented July 10, 1973

INVENTORS
EDWIN T. HILL
JOHN HARVEY QUICK
BY
Mason, Mason & Albright
ATTORNEYS

APPARATUS RESPONSIVE TO RADIATION ATTENUATION OF AN ATMOSPHERE

BACKGROUND OF THE INVENTION

The invention relates to monitoring of the attenuating effect of an atmosphere on radiation, including non-visible radiation: more particularly though not exclusively, it relates to visibility-responsive apparatus for measuring the optical extinction coefficient ($\sigma$) of an atmosphere.

Visibility-responsive apparatus is known in the form of a transmissometer. This consists of a light transmitter and a light receiver separated by a known distance. The amount of light lost over this distance is measured, and the coefficient $\sigma$ is computed from the formula $T = e^{\sigma L}$ where $T$ is the percentage of light remaining after traversing a distance L. The distance between the transmitter and the receiver is dependent on the range of visibilities of interest, and varies from 15 meters to 200 meters, but is typically 150 meters. Alignment between transmitter and receiver is critical because of the distance involved and the narrow beamwidths necessary to reduce errors. This creates a need for robust structures to support the units and to prevent movement due to wind and the like. The transmissometer is therefore disadvantageous in that it requires a site which is, say, 150 meters long and capable of providing solid foundations for relatively heavy structures at each end.

It is an object of the invention to provide an improved apparatus for monitoring the attenuating effect of an atmosphere on radiation.

It is a further object of the invention to provide visibility-responsive apparatus which overcomes or reduces the disadvantages of the transmissometer.

In accordance with the invention, there is provided apparatus for monitoring the attenuating effect of an atmosphere on radiation, comprising transmitting means operative to transmit a radiation beam into a space containing the atmosphere to be monitored, and receiving means operative to measure the amount of the said radiation which is scattered in a predetermined direction relative to the beam by the atmosphere.

DESCRIPTION OF THE DRAWINGS

Visibility-responsive apparatus embodying the invention will now be described, by way of example only, with reference to the accompanying drawings in which:

FIG. 3 is a block diagram of another form of the apparatus; and

DESCRIPTION OF THE PREFERRED EMBODIMENTS

Figure 1:
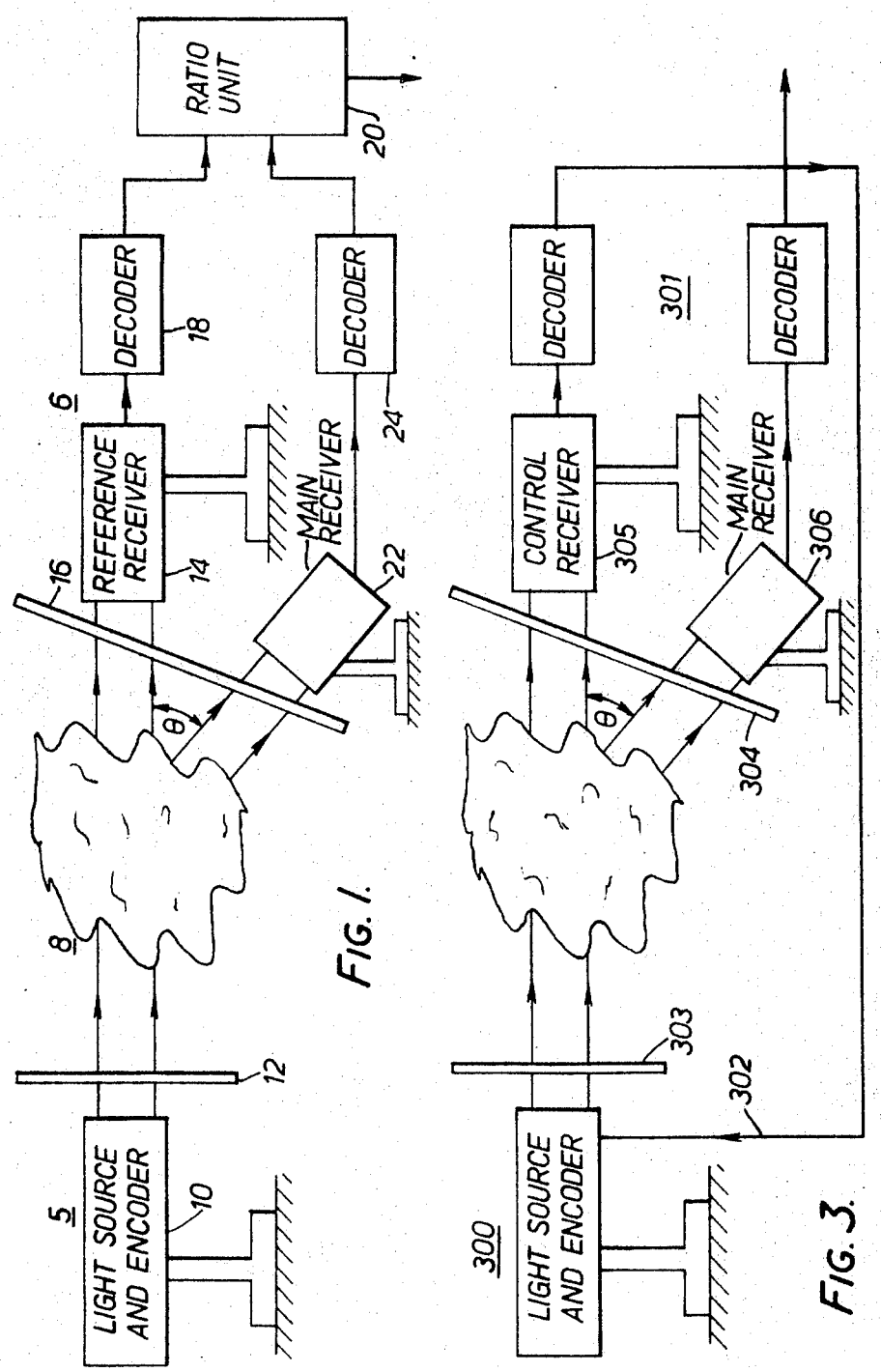
FIG. 1 is a block diagram of one form of the apparatus.
Figure 2:
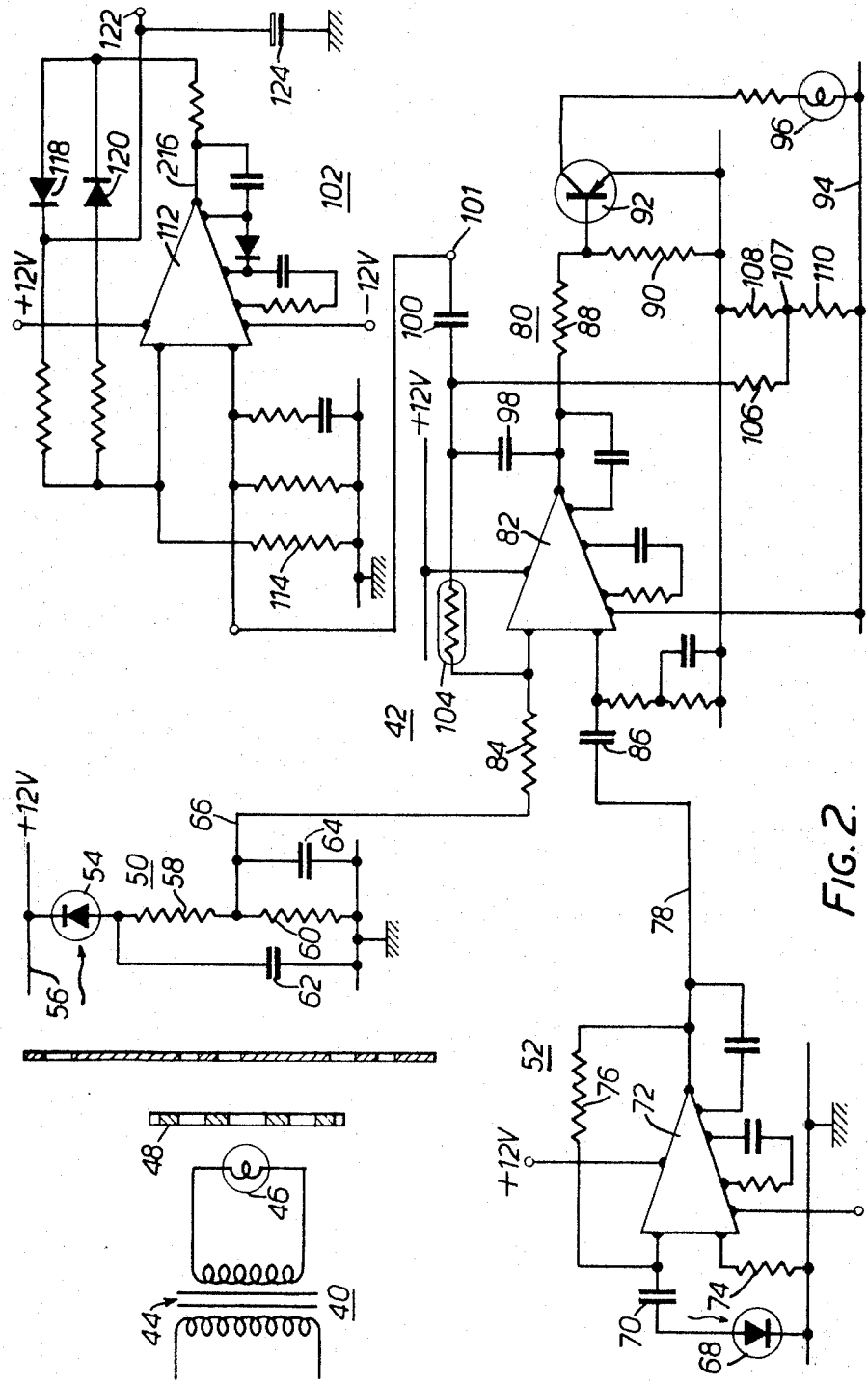
FIG. 2 is a circuit diagram of the apparatus of FIG. 1.

The apparatus of FIGS. 1 and 2 comprises a transmitter section 5 and a receiver section 6. The two sections 5 and 6 may be enclosed within respective housings which are supported at the distal ends of two upwardly and outwardly sloping arms attached to a central stand, so that the two housings face each other about 0.5 meters apart across the space 8 within which the atmosphere in visibility is to be measured. The apparatus to be described measures the visibility in terms of the optical extinction coefficient ($\sigma$) in the space 8, from which the prevailing visibility can be computed.

The transmitter section 5 comprises a light source and encoder unit 10 which together produce a beam of light encoded in a particular manner (such as by being switched on and off regularly by a mechanical chopper) which emerges into the space 8 through a heated window 12.

The receiver section 6 comprises a reference receiver unit 14 which is directly aligned with the beam produced by the unit 10 and receives the beam through a second heated window 16. The unit 14 produces an electrical output corresponding to the light received and this output is then passed through a decoder 18 to a signal processing unit 20. In addition, the receiver section 6 comprises a main receiver unit 22 which is similar in construction and operation to the unit 14 but is optically aligned so as to have its line of view (through the window 16) inclined at an angle $\theta$ to the line joining the units 10 and 14. The electrical output from the unit 22 is passed through a decoder 24 and thence to the signal processing unit 20.

In operation, the light source and encoder unit 10 project the coded light beam across the space 8. As the light beam traverses the space 8, it will be scattered by any visbility-impeding particles, such as fog particles, within the atmosphere in the space 8. Only a proportion of the original light beam from the section 5 will thus continue unaffected, and some at least of the scattered light will be deflected by the angle $\theta$ towards the main receiver unit 22. The light received by the receiver unit 14 causes the latter to produce a corresponding electrical signal which is decoded by the decoder 18 so that the output thereof is dependent only on light received by the receiver unit 14 from the transmitter section 5; that is, any part of the output signal from the receiver unit 14 due to ambient or other extraneous light is rejected by the decoder 18.

In similar fashion, the decoder 24 produces an electrical output which is dependent only on that portion of the light beam from the transmitter section 5 which has been so scattered by the atmosphere in the space 8 as to be directed at the angle $\theta$ towards the main receiver unit 22.

The signal processing unit 20 compares the two signals received from the decoders 18 and 24 and effectively takes the ratio of the output of decoder 24 to the output of decoder 18. If IS is the intensity of that proportion of the light beam which, due to scattering in the atmosphere, is deflected by the predetermined angle $\theta$ relative to the beam, and IT is the intensity of the light in the unscattered beam, then the unit 20 produces an output proportional to IS/IT, and it can be shown that this ratio is a measure of the optical extinction coefficient ($\sigma$).

Since the signal processing unit 20 takes the ratio of the two signals, the output which it produces is independent of the absolute level of the transmitted light and is thus unaffected by lamp ageing, power supply variations, and window contamination.

Preferably, the transmitter section 5 is arranged to produce white light, and the receiver units 14 and 22 should have transducers whose responses are matched to that of the human eye. For example, a tungsten halogen lamp source can be used in the section 5 and a selenium barrier photocell can be used in each of the units 14 and 22. In such an arrangement, encoding of the light beam can be carried out by a mechanical chopper. In some other applications, however, particularly where electrical power is at a premium, solid state lamps can be used with advantage. For example, a gallium arsenide lamp can be used in section 5, with silicon photo diodes in each of the receiver units 14 and 22. In such an arrangement, the light beam from the transmitter section 5 can be coded by direct electrical modulation of the lamp power supply.

FIG. 2 shows the circuit diagram of one exemplary form of the apparatus of FIG. 1. As shown, the apparatus comprises a transmitter section 40 and a receiver section 42. The transmitter section comprises a transformer 44 energizing a lamp 46 which directs a beam through a rotating, slotted disc 48. The disc 48 is rotated at such speed that the emitted light is modulated at a frequency of, in one example, 1 kc/s. The light beam passes through the heated window 12 (omitted from FIG. 2), then across the space whose visibility is to be monitored, and enters the receiver section 42 through the further heated window (also not shown in FIG. 2).

The receiver section 42 comprises detector circuits 50 and 52. Detector circuit 50 includes the receiver 14 (FIG. 1) in the form of a light-responsive diode 54 which is optically positioned so as to be directly in alignment with the beam of light emitted through the disc 48. The diode 54 is energized from a +12 volt line 56 through two resistors 58 and 60, and the modulated light beam causes it to produce a positive square wave output voltage. Two capacitors 62 and 64 cooperate with the resistors 58 and 60 to integrate this square wave output so as to produce a d.c. level, proportional to the mean intensity of the received light beam, on a line 66.

The detector circuit 52 includes the receiver 22 (FIG. 1) in the form of a further light-sensitive diode 68. Diode 68 is not mounted in alignment with the emitted light beam but is mounted at the predetermined angle $\theta$ as shown in FIG. 1. The received light causes the diode 68 to produce a square wave output which is fed through a capacitor 70 to one input of an operational amplifier 72 whose other input is connected to ground through a resistor 74. A resistor 76 provides feedback, and the output of the amplifier 72, on a line 78, comprises an alternating signal proportional to the intensity of the modulated light beam received by the diode 68.

Lines 68 and 78 are connected to the signal processing unit 20 (see FIG. 1) which comprises a ratio-determining circuit 80 including an operational amplifier 82. Line 66 is connected to one input of amplifier 82 through a resistor 84, while line 78 is connected to the other input of the amplifier through a capacitor 86. The amplifier 82 has a.c. and d.c. output paths. The d.c. output path is connected to ground through resistors 88 and 90 whose junction is connected to the base of a transistor 92. The emitter-collector path of transistor 92 is connected between ground and a −12 volt line 94 through a lamp 96.

The a.c. output path of the amplifier 82 is connected through capacitors 98 and 100 to output circuitry 102, to be described below.

The lamp 96 is physically arranged to control the resistance of a photo-sensitive resistor 104. One end of resistor 104 is connected to one input of the amplifier 82 while the other end is connected through a resistor 106 to a potential divider comprising resistors 108 and 110.

In operation the voltage ($Vr$) on line 66 adjusts the a.c. gain of the amplifier 82. Thus, a change in Vr alters the d.c. output of the amplifier 82 which consequently alters the conduction of transistor 92. The resultant change in the light output of the lamp 96 varies the resistance of the photo-sensitive resistor 104 which is connected in an a.c. feedback circuit for the amplifier 82. Under steady state conditions, the current flowing into the amplifier 82 through the resistor 84 is equal to the current flowing away from the amplifier input through the resistor 104. Therefore, if $V1$ is the substantially constant voltage at the point 107, $R1$ is the resistance of the resistor 84, $R2$ is the resistance of the resistor 106 and $r$ is the (variable) resistance of the resistor 104, then $$Vr/R1 = V1/(R2+r) \tag{1}$$

The a.c. gain of the amplifier is given by $$A = (r + R1)/R1 \tag{2}$$

If $Vi$ is the a.c. input voltage on line 78, then the output voltage $Vo$ at the terminal 101 is $$Vo = A \cdot Vi = Vi \cdot (r + R1)/R1 \tag{3}$$

The circuit is designed so that $R1$ is equal to $R2$. Therefore, from equation (1) it follows that $$(R1 + r)/R1 = V1/Vr \tag{4}$$

Substituting in equation (3) from equation (4), $$Vo = V1 \cdot Vi/Vr \tag{5}$$

The output circuitry 102 receives the voltage $Vo$ and applies it to the negative input of an operational amplifier 112 whose other input is connected to ground through a resistor 114. The output 116 of the amplifier is connected back to the positive input of the amplifier via two diodes 118 and 120, and the circuit output is produced at a terminal 122 which is connected to ground through a smoothing capacitor 124. In operation, therefore, the amplifier 112 produces a d.c. output, $VO$, at terminal 112 which is proportional to the magnitude of $Vo$.

Now, the signals $Vr$ and $Vi$ on lines 66 and 78 are respectively proportional to IT, the intensity of the modulated light received by the diode 54, and IS, the intensity of the modulated light deflected by the atmosphere at the predetermined angle and received by the diode 68. Therefore, from equation (5) and taking $V1$ as constant, $$Vo = K1 \cdot IS/IT$$

where $K1$ is a constant. Therefore, $$VO = K2 \cdot IS/IT$$

where $K2$ is another constant.

As explained above, the ratio $IS/IT$ is dependent on the scattering attenuation coefficient $\sigma$. Therefore, the circuit output, $VO$, is proportional to the desired coefficient $\sigma$. Moreover, it will be seen that the output $VO$ is substantially unaffected by attenuating effects such as window contamination, diode ageing and voltage variation which affect the outputs of the diodes 54 and 68 equally.

Figure 4:
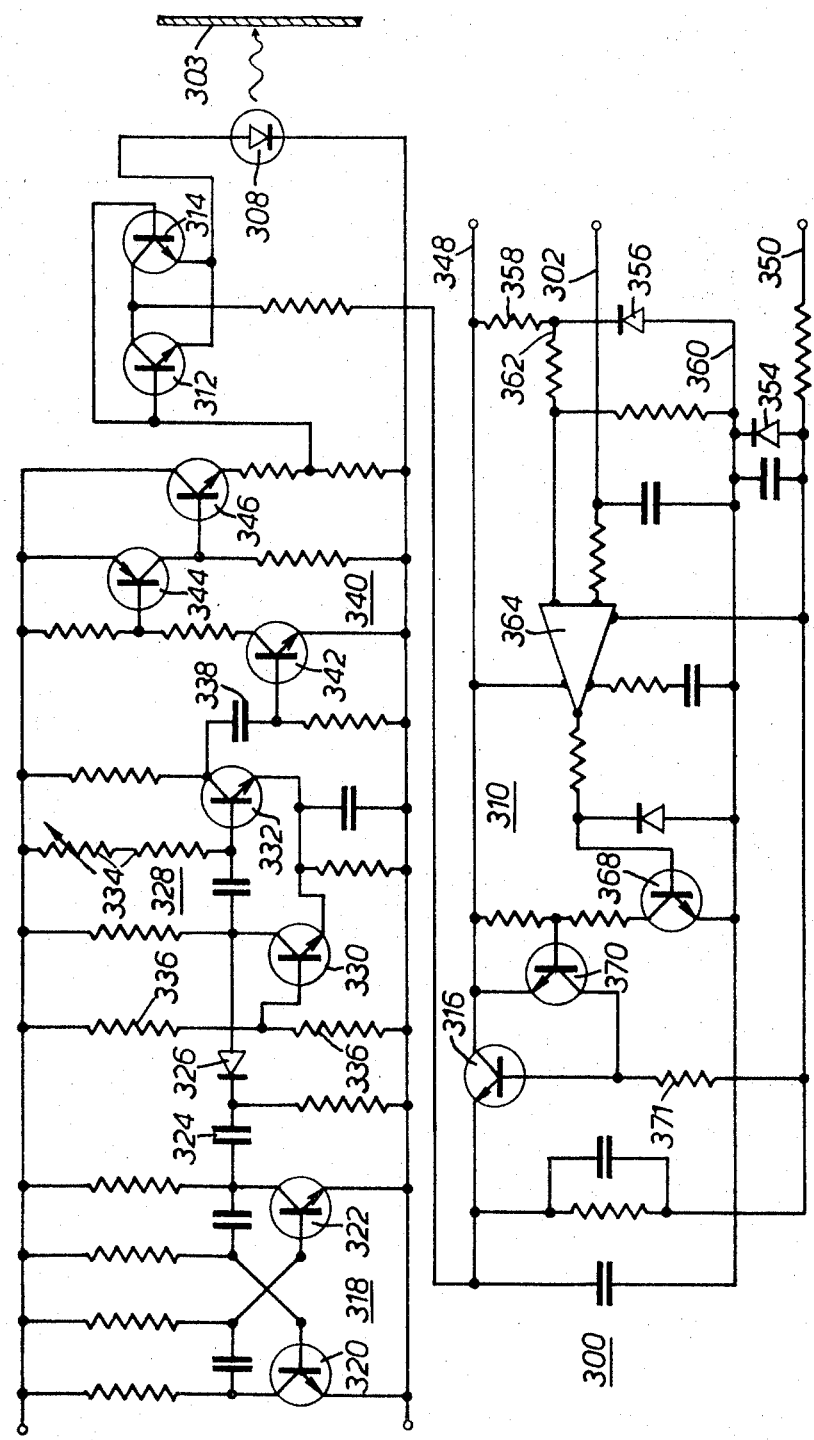
FIGS. 4 and 5 are circuit diagrams of the apparatus of FIG. 3.
Figure 5:
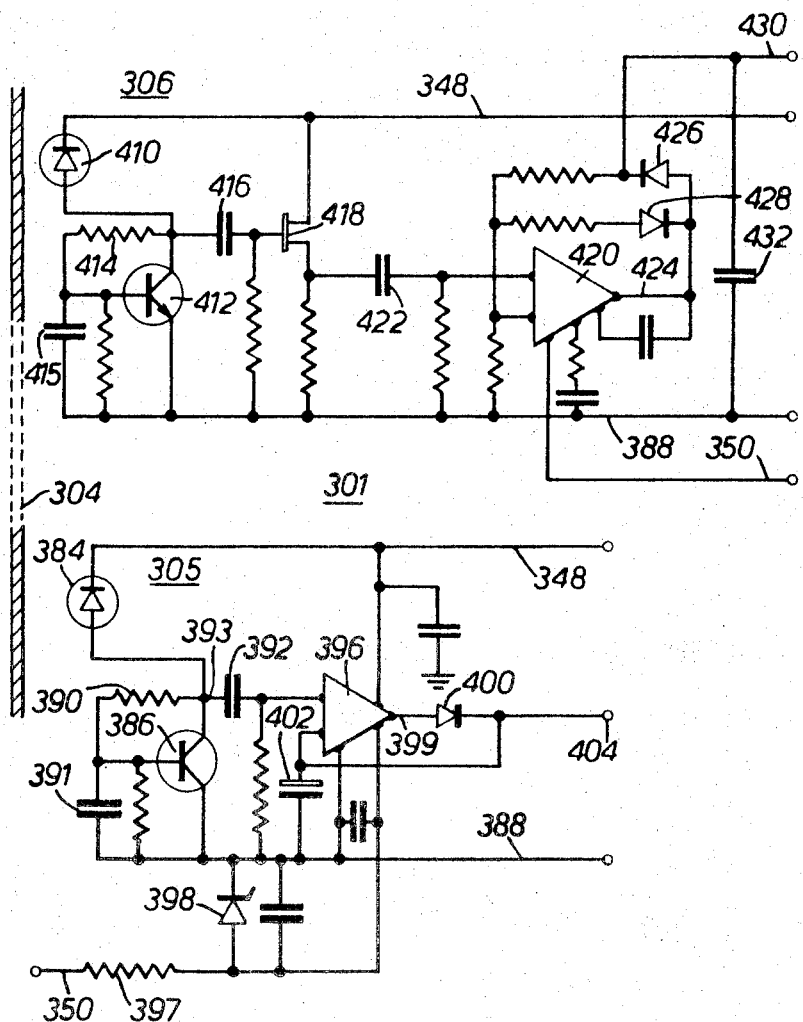

The apparatus of FIGS. 3, 4 and 5 comprises a light transmitter section 300 and a light receiver section 301. The transmitter section 300 produces light at a fixed modulation frequency, but whose intensity can be controlled by a signal on a line 302, and this light is emitted through a heated window 303 as a beam which crosses the space containing the atmosphere whose visibility is to be monitored. At the other side of the space, the beam passes through another heated window 304 and is detected by a control receiver 305 and associated decoder. In addition, the receiver section 301 includes a main receiver 306 and associated decoder which is not mounted in alignment with the beam emitted by the transmitter section 300 but at a predetermined angle $\theta$ thereto.

In a manner to be explained, the control receiver 305 monitors the intensity of the received light beam and, by means of a signal on the line 302, adjusts it as necessary to maintain it constant. The output of the main receiver 306 is thus directly dependent on the optical extinction coefficient $\sigma$ (since the reference receiver 306 has eliminated attenuation or ageing effects which affect the light beam) and the ratio-determining circuit 180 of the apparatus of FIGS. 1 and 2 is no longer required.

The transmitter section 300 (FIG. 4) comprises a light-emitting diode 308 which is connected to be supplied with energizing current from a regulating unit 310 through two parallel-connected transistors 312 and 314. In a manner to be explained, transistors 312 and 314 are switched ON and OFF at regular intervals and, when they are ON, the amplitude of the current fed to the diode 308 is determined by the conduction of a transistor 316 in the regulating unit 310. A modulated beam of light is thus emitted by the diode 308, its average intensity being determined by the conduction of transistor 16.

In order to switch transistors 312 and 314 ON and OFF, the transmitter section 305 includes a multi-vibrator circuit 318 comprising two transistors 320 and 324 whose bases and collectors are inter-connected so that the transistors are switched ON alternately. Each time the transistor 322 is switched OFF, the multi-vibrator circuit 318 produces a negative-going pulse which is fed through a capacitor 324 and a diode 326 to a mono-stable circuit 328.

The mono-stable circuit 328 comprises two transistors 330 and 332. Transistor 332 is normally held conductive by a bias resistor network 334, and transistor 330 is normally held non-conductive by a bias network 336. Each negative-going pulse fed through the diode 326 by the multi-vibrator circuit 318, however, switches transistor 332 OFF and transistor 330 ON, and the mono-stable circuit thus supplies a positive-going pulse through a capacitor 338 to a modulator circuit 340.

The modulator circuit 340 comprises three transistors 342, 344, and 346 which control the state of the transistors 312 and 314. Transistors 342, 344 and 346 are biased non-conductive and, in that state, hold transistors 312 and 314 OFF. Each positive-going pulse supplied through capacitor 338 by the mono-stable circuit 328, however, renders transistors 342, 344 and 346 conductive, thus switching transistors 312 and 314 ON.

Therefore, the frequency at which transistors 312 and 314 are switched ON and OFF is determined by the frequency of the multi-vibrator circuit 318.

The regulating circuit 310, for energizing the diode 308 through the transistors 312 and 314, is energized from positive and negative supply lines 348 and 350. A potential divider comprising two zener diodes 354 and 356 and a resistor 358 is connected between the lines 348 and 350 and provides stabilized d.c. voltages on lines 360 and 362. Line 362 is connected as one input to a differential amplifier 364 whose other input is received on the line 302 (see FIG. 3).

The output of the amplifier 364 controls the conduction of two transistors, firstly a transistor 368 whose emitter-collector circuit is connected between lines 348 and 360, and secondly a transistor 370 whose emitter-collector circuit is connected between lines 348 and 350. As shown, the base of transistor 316 is connected to the line 350 in parallel with the collector of transistor 370 through a load resistor 371, and transistor 370 therefore controls the conduction of the transistor 316.

Thus, amplifier 364 controls the conduction of transistor 316 in dependence on the difference, if any, between the two signals which it receives by means of the lines 362 and 302.

The receiver section 301 (FIG. 5) of the apparatus comprises the control receiver 305 and the main receiver 306. The receiver 305 comprises a light-responsive diode 384 which is optically positioned so as to be directly in alignment with the beam of light emitted from the diode 308 in the transmitter section 300. The diode 384 is connected in series with the emitter-collector circuit of a transistor 386, and the series combination is connected between a grounded line 388 and the positive supply line 348. Feedback from the collector to the base of the transistor is provided via a resistor 390 in series with a capacitor 391. The collector of transistor 386 is connected through an a.c. coupling capacitor 392 to the positive input of a differential amplifier 396. The amplifier 386 receives power from the lines 348 and 388 and also from the line 350 (see FIG. 4) via a resistor 397 and a zener diode 398. The output 399 of the amplifier 396 is connected back through a diode 400 to the negative input of the differential amplifier, and the latter input is connected to ground through a capacitor 402. Terminal 404 provides the output of the detector circuit 380 and is connected to the line 302 of FIGS. 3 and 4.

In operation, the resistance of diode 384 depends on the total light received, the resistance decreasing as the light increases. The ambient light received (that is, excluding the light received from the diode 308) is such that the corresponding resistance of the diode 384 maintains transistor 386 partially conducting by virtue of the feedback connection through the resistor 390.

Diode 384 will have a relatively high resistance during the gaps between the light pulses in the beam emitted by the diode 308, and each received pulse of light causes its resistance to fall. These rapid changes in resistance do not affect the base of transistor 386 because of the presence of capacitor 391. Electrical pulses having a constant frequency but an amplitude which varies according to the intensity of the received light are therefore produced at the point 393 and fed into the differential amplifier 396. The feedback connection between the amplifier output 398 and the negative input of the amplifier causes the charge on capacitor 402 to follow the mean level of the pulses produced at the point 393.

If the ambient light intensity changes, the conduction of transistor 386 will, by virtue of the feedback connection through the resistor 390, change in such a sense as to offset any resultant change in potential at the point 393, and the output at terminal 404 is thus substantially unaffected by ambient light changes but is proportional to the mean intensity of the light emitted by the diode 308 (FIG. 4).

Therefore, an increase in intensity of the light emitted by the diode 308 causes control receiver 305 to reduce the output of the differential amplifier 364 (FIG. 4). This decreases the conduction of transistors 368 and 370, and consequently reduces the conduction of transistor 316. Therefore, the mean current supplied to the diode 308 is decreased, and the intensity of light emitted by the diode 308 is brought back towards the reference level established by the zener diodes 354 and 356.

Thus, the mean intensity of light emitted by the diode 308 is adjusted automatically to compensate for changes in supply voltage, ageing of the light source and attenuation in the atmosphere in the space being monitored or due to dirt and the like on the windows through which the light beam passes.

The main receiver 306 comprises a further light-sensitive diode 410. Diode 410 is not mounted in alignment with the emitted light beam but is mounted at the predetermined angle $\theta$ thereto. The diode 410 is connected in series with the emitter-collector path of a transistor 412, and the series combination is connected between the positive supply line 348 and ground 388. Transistor 412 is connected in a manner similar to that of transistor 386 of the control receiver 305, and has a feedback resistor 414 and capacitor 415. The collector of transistor 412 is connected through a coupling capacitor 416 to the gate electrode of a field effect transistor 418 whose source and drain electrodes are connected between the lines 348 and 388. The output of transistor 418 is connected to the positive input of a differential amplifier 420 through a coupling capacitor 422. The output 424 of the amplifier 420 is coupled back to the negative input of the amplifier via two diodes 426 and 428, and the circuit output is produced on a line 430 which is connected to ground by a smoothing capacitor 432.

In operation, the resistance of the diode 410 varies with the intensity of the light falling on it in similar fashion to the diode 384. The resistor 414 and the capacitor 415 co-operate, in the manner explained in conjunction with the control receiver 305, so that the collector voltage of transistor 412 is substantially independent of ambient light changes. In addition, the scattering effect of the atmosphere in the space being monitored will cause some of the modulated light beam from the diode 308 to be picked up by the diode 410. Pulses having a constant frequency, but whose amplitude depends on the intensity of the light scattered in this way, are therefore produced at the collector of transistor 412. These pulses are amplified by the transistor 418 and supplied to the positive terminal of amplifier 420. The feedback paths provided by the diodes 426 and 428 ensure that the amplifier output signal on line 424 closely follows the signal at the positive input terminal of amplifier 420. The mean level of the output signal on line 430 is therefore proportional to the mean level of that part of the beam transmitted by the diode 308 which is scattered on to the diode 410.

As has been referred to above in connection with FIGS. 1 and 2, it can be shown that $\sigma$, the optical extinction coefficient of the atmosphere in the space being monitored, is given by $$\sigma = f(IS/IT)$$

Where $IS$ is the intensity of that proportion of the light beam which, due to scattering in the atmosphere, is deflected by a predetermined angle relative to the beam, and where $IT$ is the intensity of light in the beam emitted by the diode 8. The output signal on the line 430 of the output channel 82 (FIG. 5) is proportional to $IS$. $IT$ can be regarded as constant since any variations which take place in the light output of the diode 308 are in response to the action of the control receiver 305 and are merely to compensate for attenuation or ageing effects which affect the light received by the diode 410 as well as that received by the diode 384. Therefore, the signal on line 430 is always proportional to the coefficient $\sigma$ of the atmosphere between the windows 303 and 304.

The apparatus of FIGS. 1 and 2 may be modified by incorporating a phase sensitive detector to detect the output of the ratio unit 20 instead of the type of detector shown in FIG. 2 at 102. In such a modification, the reference receiver 14 and decoder 18 would be arranged to produce two outputs. One such output would represent the level of the light beam received by the receiver 14 and would control the ratio unit 20 in the manner explained in connection with FIGS. 1 and 2. The second output, however, would comprise an alternating waveform in phase with the modulation of the light beam, and this second output would control the phase sensitive detector.

The apparatus of FIGS. 3, 4 and 5 can also be modified by the incorporation of a phase sensitive detector, in this case to replace the type of detector shown in FIG. 5 receiving the output of the transistor 418. This phase sensitive detector would be controlled by a line connected to the multivibrator circuit 318 (FIG. 4) so as to carry a signal in phase with the modulation on the light beam.

The use of a phase sensitive detector in the manner described in the above two modifications may be advantageous in certain operating conditions, such as in sudden changes of radiation attenuation (such as resulting from rain) for example. In each case, the phase sensitive detector may be of known form.

The forms of apparatus described and illustrated are advantageous over transmissometer-type instruments which require a considerable distance between receiver nd transmitter sections and which thus present difficulties of mounting and alignment: the apparatus described and illustrated, on the other hand, require only a very short distance between the transmitter and receiver sections (of the order of 0.5 meters, for example), and can thus be used in many applications such as for motorway warning systems, on board ships, and airfield runway visibility monitoring systems for which the transmissometer-type arrangements are not entirely suitable.

The apparatus described and illustrated does not measure those factors which reduce visibility other than by light scattering: however, in general almost all light attenuation in normal circumstances is due to scattering and very little to absorption.

The angles $\theta$ can be varied according to the particular application and the optimum angle may be dependent on the expected visibility. Angles of 30° to 45° are typical.

A plurality of apparatuses can be combined to give spatial information.

Although the forms of apparatus described and illustrated respond to visible light and thus measure the attenuating effect of the atmosphere on visible light, it will be appreciated that with suitable modification to the beam source and detecting circuitry, the apparatus could be easily modified to respond to non-visible radiation and thus to measure the attenuating effect (due to scattering) of an atmosphere on such non-visible radiation, and the term "radiation" as used herein includes both visible and non-visible radiation. In particular, the apparatus described and illustrated may with advantage be designed to respond to infra-red radiation. The term "atmosphere" as used herein includes any ambient environment which may contain radiation-scattering particles.

What is claimed is:

1. Apparatus for monitoring the attenuating effect of an atmosphere on radiation, comprising
   radiation transmitting means,
   first means mounting the transmitting means to transmit a radiation beam into a space containing the said atmosphere,
   a first electrical transducer producing an electrical output signal dependent on the radiation received thereby, and a second electrical transducer producing an electrical output signal dependent on the radiation received thereby, one of the said electrical output signals being a d.c. signal and the other of the said electrical output signals being an a.c. signal,
   second mounting means comprising means mounting the first transducer in optical alignment with the direction of the said beam, and means mounting the said transducer with its line of sight angled with respect to the said direction,
   an operational amplifier having its two inputs respectively connected to receive the d.c. and a.c. signals,
   an a.c. feedback circuit for the amplifier and including a resistor which is variable to adjust the a.c. gain of the amplifier,
   a d.c. output circuit for the amplifier and responsive to changes in the value of the said d.c. signal to vary the value of the variable resistor correspondingly, and
   an a.c. output circuit for the amplifier in which is produced an a.c. output which is dependent on the ratio of the d.c. and a.c. signals at the inputs of the amplifier.

2. Apparatus according to claim 1, in which the variable resistor in the a.c. feedback circuit of the amplifier is a light-sensitive resistor, and in which the d.c. output circuit of the amplifier includes a lamp arranged to direct light on to the light-sensitive resistor and means responsive to the variation in the d.c. output of the amplifier to adjust the light output of the lamp.

3. Apparatus for monitoring the attenuating effect of an atmosphere on radiation, comprising
   a light source operative to produce a beam of light modulated at a predetermined frequency,
   first mounting means mounting the light source to transmit the beam of light into a space containing the said atmosphere,
   first and second photoelectric transducers each having an electrical resistance which varies with the intensity of the light falling thereon,
   second means mounting the first transducer in optical alignment with the direction of the said beam whereby to receive the said beam after transmission across the space, and mounting the second transducer with its line of sight angled with respect to the direction of the said beam,
   sensing means measuring the intensity of the unscattered transmitted beam as received by the first transducer and producing a control signal in dependence on changes in the said intensity,
   means responsive to the control signal to control the intensity of the transmitted beam so as to offset changes therein caused by factors other than the said scattering, and
   means tuning each transducer to produce an electrical output whose amplitude is dependent on the mean intensity of the light received at the modulation frequency and is substantially independent of any ambient light received, each tuning means comprising a respective transistor, means connecting the respective photo-electric transducer to form the collector load resistance of the transistor, and a feedback path from the collector of the transistor to its base including capacitive means selected to substantially prevent changes in resistance of the transducer in response to the light beam from affecting the base of the transistor, whereby its collector voltage changes in correspondence with the modulation of the light beam, but allowing changes in resistance of the transducer due to changes in ambient light to so alter the conduction of the transistor as to render the collector voltage thereof substantially independent of the ambient light variations.

* * * * *